United States Patent [11] 3,588,841

[72] Inventor Robert A. Ragen
Hayward, Calif.
[21] Appl. No. 811,036
[22] Filed Mar. 27, 1969
[45] Patented June 28, 1971
[73] Assignee The Singer Company

[54] PROGRAMMABLE ELECTRONIC CALCULATOR
18 Claims, 18 Drawing Figs.

[52] U.S. Cl. .......... 340/172.5
[51] Int. Cl. .......... G06f 15/02
[50] Field of Search .......... 340/172.5; 235/157

[56] References Cited
UNITED STATES PATENTS

| | | | |
|---|---|---|---|
| 3,315,234 | 4/1967 | Ruth | 340/172.5 |
| 3,405,392 | 10/1968 | Milne et al. | 340/172.5 |
| 3,419,850 | 12/1968 | Krammer | 340/172.5 |
| 3,428,950 | 2/1969 | Ned Chang et al. | 340/172.5 |

*Primary Examiner*—Gareth D. Shaw
*Attorneys*—Patrick J. Schlesinger, Charles R. Lepchinsky and Jay M. Cantor

ABSTRACT: A programmable electronic calculator having a normal, learn, and recall mode of operation is disclosed which has a means for storing both numeric data and instruction characters in interlaced fashion, and arithmetic and control means for performing operations on the numeric data in accordance with the instruction characters when the calculator is in recall mode. The calculator includes circuitry for ring-shifting the set of instruction characters until all learned operations have been performed. The calculator also has a manually actuatable program reset means which aligns the set of instruction characters to place the first-entered character in recall position in the storage mans, and a manually actuatable resume means which causes the arithmetic and control means to resume performing operations on the numeric data after a stop character has halted the ring-shifting operation.

INVENTOR
Robert A. Ragen
BY
[signature]
ATTORNEY

| INSTRUCTION CHARACTER | FUNCTION | |
|---|---|---|
| 0 | STOP | |
| 1 | MULTIPLY | ( X= ) |
| 2 | INTERCHANGE | ( I ) |
| 3 | DIVIDE | ( ÷= ) |
| 4 | DUPLICATE | ( DUP ) |
| 5 | FROM MEMORY | |
| 6 | FIRST NUMBER PRINT | ( FN ) |
| 7 | TO MEMORY | |
| 8 | ADD | ( + ) |
| 9 | SUBTRACT | ( – ) |

Fig. 16

PROGRAMMABLE ELECTRONIC CALCULATOR

BACKGROUND OF THE INVENTION

1. Field of the Invention

This invention relates to electronic desk top calculators, and more particularly to a programmable electronic calculator in which both numeric data and instruction characters are stored in interlaced fashion.

2. Brief Description of Prior Art

In recent years, relatively small desk top electronic calculators have increasingly been utilized for performing arithmetic operations for accounting, scientific, and like uses. Known electronic calculators are ordinarily provided with storage means having a plurality of registers for storing numeric data which is entered by an operator via a keyboard. When a particular digit key is depressed, circuitry associated with the keyboard generates electrical signals representing that digit, and the signals cause a representation of that digit to be placed in a register in the storage portion of the apparatus. For example, if the storage portion is a delay line, the signals cause a write transducer to produce a plurality of pulses on the line. After a complete number, which may comprise several digits, has been entered into the storage means, but before the first digit of a second number is entered, the first number is ordinarily relocated to a second position in the storage means by shifting the number from the entry register to a different register. After the second number has been entered in the above-described manner, a function key is normally depressed which signifies a particular arithmetic operation, such as addition, to be performed. Actuation of a function key causes associated circuitry to generate electrical signals which control the operation of an arithmetic portion of the calculator which performs the desired operation on the stored numeric data. After the operation has been completed, the resulting number which is located in one of the registers is usually indicated to the operator by causing it to be displayed on the face of a cathode-ray tube or to be printed out by a mechanical or optical printer.

It has been found convenient to arrange the registers in the storage means so that all numbers are entered into and removed from the storage portion via an entry register. In such an arrangement, at any given time, the most recently entered number is located in the entry register while the least recently entered number is located in the register which is farthest from the entry register. Such an arrangement is properly termed a "last-in, first-out" or LIFO register.

In many calculation operations, several sets of different numeric data are used to calculate results according to the same formula. In such an operation, it is highly desirable that the calculator have a programmable memory for storing the different functional steps, e.g., addition or subtraction, in the sequence in which they are to be performed on numeric data as it is entered into the calculator. These stored steps can then be used to control the operation of the arithmetic portion of the calculator. Such an arrangement eliminates the possibility of human errors in choosing the different arithmetic operations to be performed—which usually result from an operator accidentally actuating the wrong function key of the calculator keyboard—and thus increases the efficiency of the calculating operation. Moreover, since the operator no longer must depress several different function keys while calculating results using a given set of numeric data, the speed with which the results can be calculated is also increased.

In known devices designed in accordance with the above principles, e.g., the calculator disclosed in U.S. Pat. No. 3,328,763 to Rathbun et al., each arithmetic function which the machine is capable of performing is assigned a different numeric value or code and circuitry is arranged to generate an instruction character representing that code whenever the function is specified by actuation of the corresponding key. With the calculator in LEARN mode, after each of the various arithmetic functions has been performed on the first set of data, the instruction character corresponding thereto is stored in the program register of the memory or storage portion. After the instruction character for the final step has been stored in the program memory and the calculator is ready to begin calculations with the second set of numeric data, the machine is placed in RECALL mode. As the numeric data from the second set is entered by the operator, the electronic circuitry causes each instruction character in the program memory to sequentially control the operation of the arithmetic portion of the calculator. As each instruction character is used, it is replaced back in the program memory in such a manner that the character sequence is preserved. Thus, after the last step has been completed and the machine is ready to begin calculations using the third set of numeric data, the instruction characters are once again arranged in the program memory according to their order of entry, with the first-entered instruction character ready to be recalled. Such an arrangement is properly termed a "first-in, first-out" or FIFO storage.

SUMMARY OF THE INVENTION

Briefly described, the present invention is directed to an improved electronic desk top calculator having a great deal of flexibility for multipurpose use, while being economical to manufacture and maintain. The improved calculator includes a storage means having a plurality of registers for storing numeric data and instruction characters, said registers each comprising a plurality of compartments which are serially accessed with like order compartments for all registers being adjacent so that the registers are interlaced, the numeric data being arranged on a last-in, first-out, or LIFO, basis and the instruction characters arranged on a first-in, first-out, or FIFO, basis. The calculator includes a means for entering numeric data into a numeric data access compartment and instruction characters into an instruction character access compartment when the calculator is in LEARN mode. The calculator further includes a means for aligning the entered set of instruction characters to place the first entered character in an instruction character recall compartment when the calculator is in RECALL mode, as well as a means for ring-shifting the set of characters successively until all characters have been used to control the operation of the arithmetic and control portion of the machine. The calculator is also provided with a resume means for causing the ring-shifting means to resume the ring-shifting operation on the stored set of instruction characters after a sensed stop code has caused this operation to halt.

For a fuller understanding of the nature and advantages of the invention, reference should be had to the following detailed description, taken in conjunction with the accompanying drawings wherein like reference characters designate like or similar elements throughout the various views and in which:

BRIEF DESCRIPTION OF THE DRAWINGS

FIG. 16 is a code table illustrating the instruction characters corresponding to programmable functions utilized in the preferred embodiment of the invention.

Referring now to the drawings in detail, FIG. 1 is a perspective view of an electronic desk top calculator 10 embodying the invention, while FIG. 2 shows the keyboard 11 of a preferred embodiment of the invention. The illustrated keyboard has digit keys 12 for entering numeric data into the calculator digit-by-digit. In the calculator disclosed herein, actuation of a digit key results in entry of that digit into the calculator memory. The illustrated keyboard is also provided with function keys 14 which, when actuated by an operator, result in the performance of that function on the entered numeric data. The function keys 14 are classifiable as two distinct types: those which specify an arithmetic function (add, subtract, multiply, and divide) and those which specify a nonarithmetic function (to memory, from memory, etc.). LEARN key 16, when actuated, directs the calculator to store in sequence all subsequently specified functions. PROGRAM RESET key 18, when actuated, directs the calculator to automatically perform those functions previously stored, in their order of entry, on newly entered numeric data until a stop code is sensed. AUTO key 20 is a dual function key which, when actuated while the LEARN key is depressed, causes a stop code to be stored in the calculator memory and, when actuated while the PROGRAM RESET key is depressed, causes the calculator to resume operating in RECALL mode after a stop code has been sensed.

DATA ORGANIZATION

Figure 3:
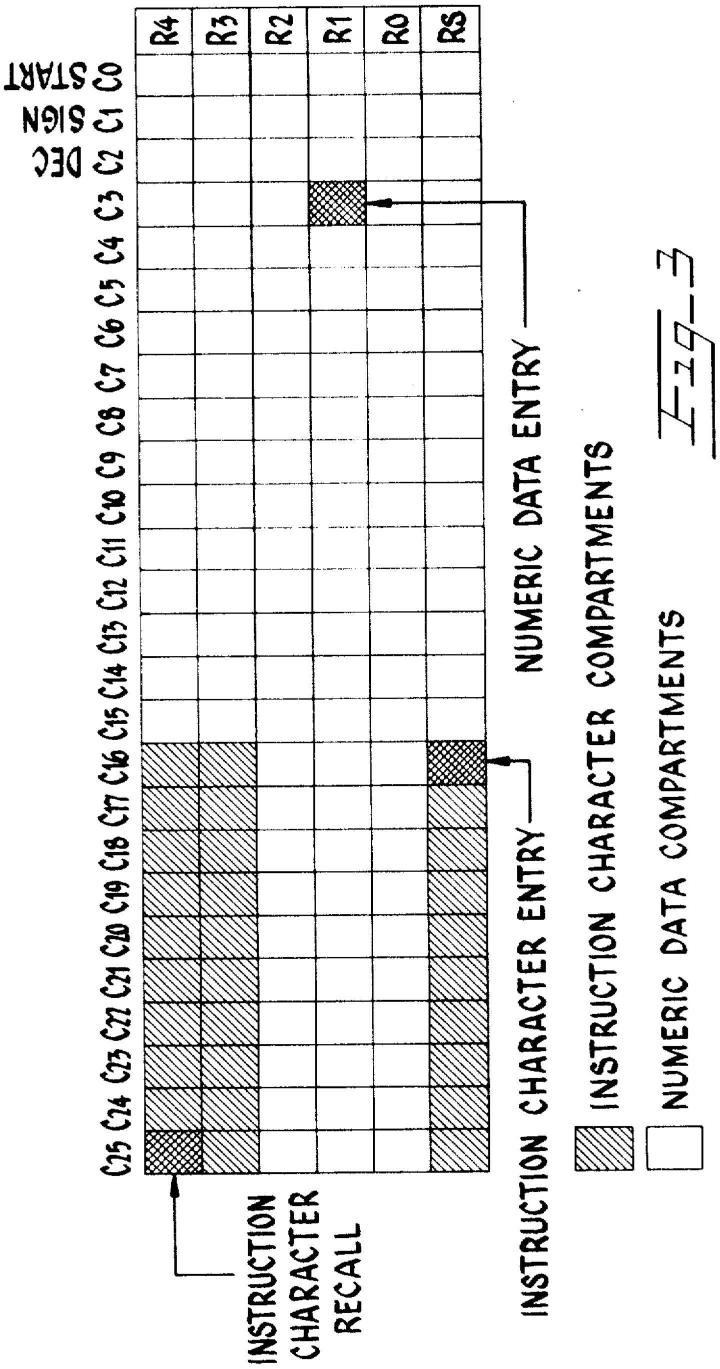
FIG. 3 illustrates the register organization of the preferred embodiment.
Figure 4:
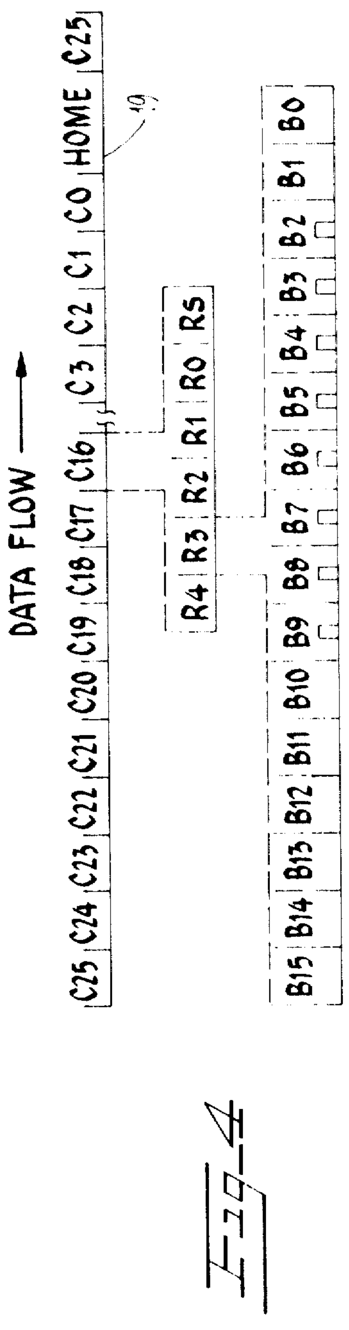
FIG. 4 shows a serial data train utilized in the preferred embodiment.

The organization of data utilized in the preferred embodiment is illustrated in FIGS. 3 and 4. FIG. 3 shows an organization of a plurality of registers RS, RO, R1, R2, R3, and R4, each having a plurality of compartments CO through C25. In registers RO, R1, and R2, these compartments are all used for numeric data. In registers RS, R3, and R4, on the other hand, compartments C16 through C25, which have been shaded for clarity, are reserved for instruction characters representing functions rather than numeric data. As will be apparent to those skilled in the art, this organization may be achieved in various ways, such as by a magnetic core memory (with the number of cores at each data location being determined by the code used), one or more tracks on a magnetic drum, or the like. In the preferred embodiment of this invention, the register organization of FIG. 3 is realized by a serial data train which is recirculated through a suitable delay device, such as an acoustic delay line. This serial data train is arranged, as shown in FIG. 4, with the compartments of the registers interlaced such that like orders C of compartments of each register occur as a group with the lowest order compartments being first in time and the highest order compartments being last in time, the direction of data flow being to the right as indicated by the arrow. For example, column-time C16 includes the like order compartments of each register RS, RO, R1, R2, R3, and R4, with the lowermost register RS compartment occuring first and the uppermost register R4 compartment occurring last. Each complete occurrence of the data train CO through C25 is followed by a HOME period 19 during which time no signals or data occur and after which the entire data train is repeated.

In the above organization, the first column CO contains a start pulse or signal which indicates the end of the HOME period and the beginning of a new serial data train, CO to C25. The contents of column C1 compartments designate the sign of each numeral, if any, in associated registers RS, RO, R1, R2, R3, and R4. The compartments of the column C2 contain the decimal point information relating to each numeral, if any, in associated registers RS, RO, R1, R2, R3, and R4. The compartments of columns C3 to C25 associated with registers RO, R1, and R2 and the compartments C3 to C15 of registers RS, R3, and R4 contain the digits of the number, if any, in each associated register, and the compartments of columns C16 to C25 of registers RS, R3, and R4 contain instruction characters. The time of occurrence of a particular compartment determines whether the character specified represents the digit of a number or a function to be performed. Those compartments which have special significance are cross-hatched and indicated by labeled lead lines in FIG. 3. These are C3R1, the numeric data entry compartment; C16RS, the instruction character entry compartment; and C25R4, the instruction character recall compartment. The significance of these compartments is discussed below in detail.

In the preferred embodiment, each compartment utilizes a pulse count notation such as is illustrated in FIG. 4 for the sixteenth order C16 of the register R3. Each compartment contains 16 B0 to B15 time spaces, only nine of which, B2 to B10, are used to provide pulse count notations for each of the digits zero through nine. For example, a one is denoted by a pulse in the time period B2, a two denoted by a pulse in each time period B2 and B3, a three is denoted by a pulse in each time period B2, B3, and B4, etc., with a zero being indicated by an absence of a pulse in the time periods B2 to B10. Thus, FIG. 4 illustrates an eight in the C16 compartment of the register R3.

Figure 5A:
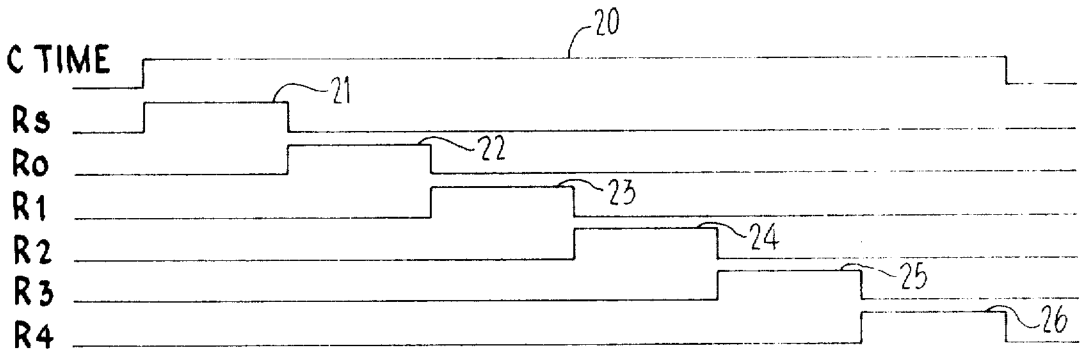
FIGS. 5A and 5B show appropriate timing signals used to control the operation of the invention.
Figure 5B:
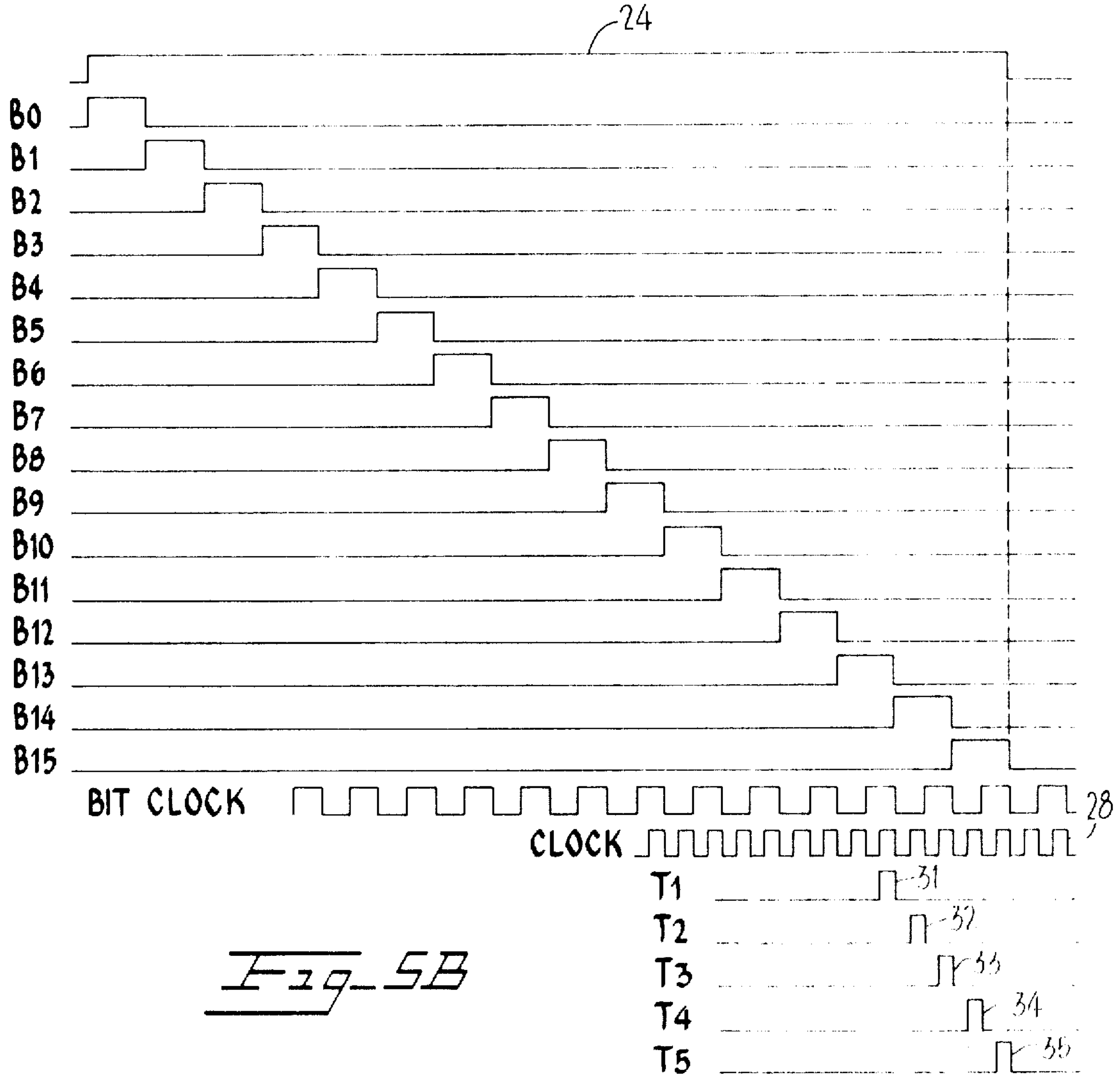

The register organization illustrated in FIG. 3 is accessed in an interlaced, serial manner as shown in FIG. 4 by means of recurring control and timing signals such as illustrated by FIGS. 5A and 5B. Referring now to FIG. 5A, there is illustrated a single column C signal 20. For purposes of simplicity and clarity, only one column signal is illustrated. As will be apparent to those skilled in the art, however, the column signal will occur sequentially, there being one such signal for each of the columns CO to C25. For each column signal there are six independently occurring register signals 21—26, one for each of the six registers RS, RO, R1, R2, R3, and R4, respectively, with the register RS control signal 21 occurring first in time and the register R4 control signal 26 occurring last in time as shown in FIG. 5A. As will now be apparent, the simultaneous occurrence of a column C signal and one register signal determines the occurrence, or accessibility, of a particular compartment CO to C25 of a particular register with like order register compartments occurring consecutively for each column.

As discussed above, each register compartment includes 16 B0 to B15 time spaces. Access to such time spaces is accomplished by 16 independent and consecutively occurring signals as illustrated in FIG. 5B for the register R2 control signal 24 of FIG. 5A. FIGS. 5A and 5B thus illustrate control signals that may correspond to each of the 16 time spaces BO—B15 of each register compartment and each compartment CO—C25 of each register.

The signals illustrated in FIGS. 5A and 5B can be generated by any number of well-known means, such as by applying the output 28 of a square-wave oscillator, or clock, to a series of counters, the outputs of selected stages of which are gated. In the preferred embodiment of the invention, the clock signal generator is activated by the start of the serial data train, CO to C25 (shown in FIG. 4) and inactivated during the time interval between successive data trains, that is, during the occurrence of the HOME period 19. Also, for reasons that will be apparent from the description below, subsequent to the time period for each compartment during which the serial pulse count notation may occur (B2 through B11), but before the end of the compartment time period, a series of five independent, consecutively occurring T signals are generated. These signals, T1 through T5, denoted by the reference numerals 31 through 35, respectively, are used to initiate various arithmetic and control operations, such as setting various counters to zero, transferring digit information from one counter to another, and the like.

It is to be understood that the timing and control signals shown in FIGS. 4, 5A, and 5B merely illustrate one way of accessing a register organization as shown in FIG. 3 and that various other signal arrangements may be devised to accomplish the same purpose.

Figure 6:
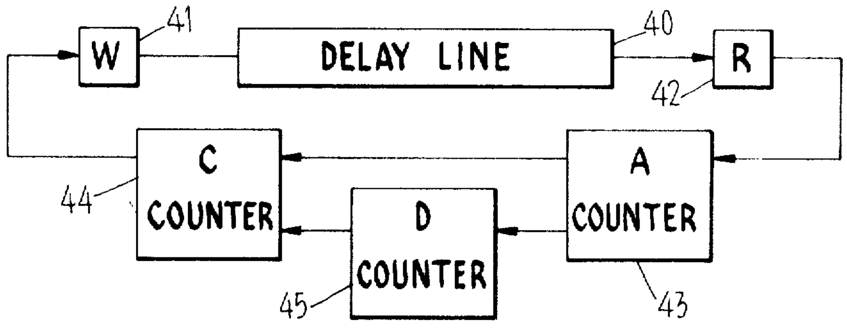
FIG. 6 illustrates in block diagram form the general organization of the preferred embodiment.

FIG. 6 illustrates in block diagram form the general organization of the preferred embodiment of the calculator. A serial memory device 40, such as an acoustic delay line, has write 41 and read 42 transducers associated with opposite ends thereof. Associated with the delay line are three registers, or counters 43—45 for providing two external data recirculation paths for a data train, such as illustrated in FIG. 4. Each counter is adapted to store a single digit (zero through nine). The A counter 43 receives the serial data emanating from the delay line 40 and is adapted to be counted either up or down. Digit data in the A counter 43 can be transferred in parallel to the C counter 44 which adapted to be counted down in order to serially place the data therein onto the delay line 40. The data recirculating through the delay line 40, A counter 43, and C counter 44 can be further delayed for reasons discussed below, by being transferred in parallel from the A counter 43 to the D counter 45, and therefrom in parallel to the C counter 44.

The operation of the apparatus of FIG. 6 is such that each digit emerging from the delay line is counted into the A counter 43 so that each pulse of the digit causes the A counter 43 to advance one count. The digit is then shifted, in parallel, into the C counter 44 by the occurrence of a T1 signal 31 (see FIG. 5B) and the C counter 44 is then counted down to a zero configuration. Each down count of the C counter 44 results in a pulse being launched on the delay line. After the digit is shifted from the A counter 43 to the C counter 44, the A counter 43 is caused to be zero set by the occurrence of a T4 signal 34 (see FIG. 5B) so that the next digit to emerge from the delay line may be counted into it. Addition of two digits is accomplished by control logic (not shown) that inhibits the zero setting of the A counter 43. Accordingly, a second digit emerging from the delay line is added to a first digit already contained in the counter. For subtraction, the control logic inhibits the zero set signal and as the pulses of the second digit emerge from the delay line, the control logic will cause the A counter 43 to be counted down instead of up as is done in addition. Multiplication and division can be accomplished by successive addition and subtraction, respectively.

DATA HANDLING

In addition to the above-described arithmetic operations, the calculator generally illustrated in FIG. 6 is organized to perform several basic data handling operations. Where appropriate, in the following discussion, references to A counter 43, D counter 45, and C counter 44 have been abbreviated to A, D, and C, respectively, to avoid unnecessary prolixity. The first of these data handling operations, already discussed above, is termed IDLE and consists of the normal progression of data from the delay line to A counter, from A counter to C counter, then from C counter back to the delay line. The remainder of these data handling operations are shifting operations wherein the contents of the various compartments are shifted from one location to another in the serial data train. These operations are now described with reference to FIGS. 6—10.

The first shifting operation, SHIFT UP, consists of inserting the D counter into the normal progression of data so that the numeric data progresses from line-A, A-D, D-C, and C-line. This can be done in any suitable way known to those skilled in the art. In the preferred embodiment, the normal A-C shift is inhibited and a D-C shift enabled during the occurrence of the T1 timing signal 31 (FIG. 5B). After the D-C shift, D is cleared by the occurrence of a T2 signal 32. An A-D shift is then enabled by T3 signal 33 after which A is cleared by T4 signal 34. Since the insertion of an additional counter in the path of the data introduces a delay of one compartment time, this results in all numeric data being placed in the next succeeding compartment.

Figure 7:
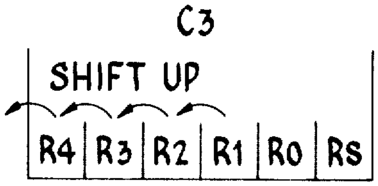
FIGS. 7 to 10 illustrate various data handling operations utilized in the preferred embodiment.
Figure 10:
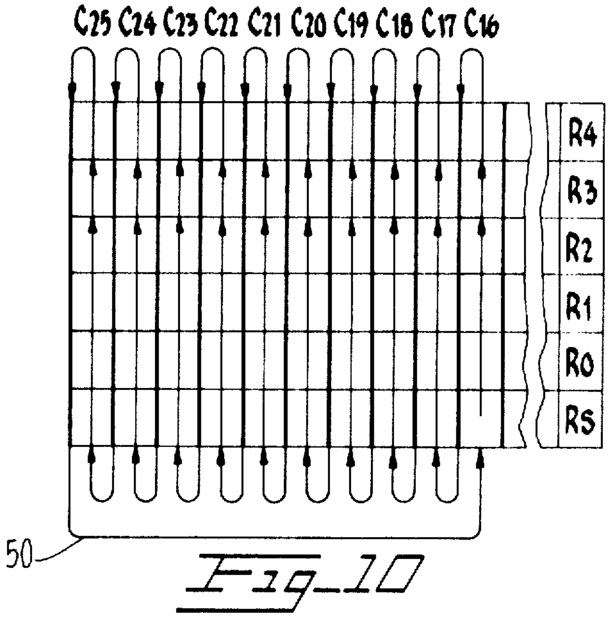
Figure 8:
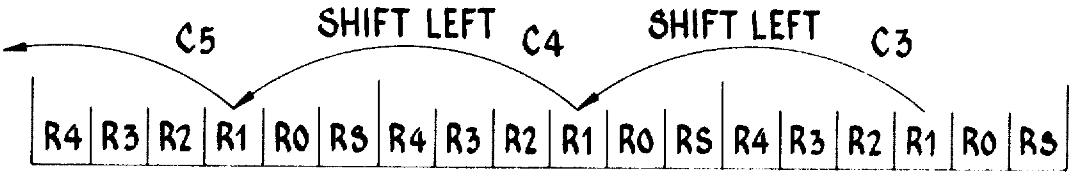

For example, as discussed below in conjunction with the entry of numeric data, before the entry of a first digit of a new number from the keyboard, it is desirable to clear the entry register R1. This is accomplished by a SHIFT UP of the contents of registers R1 to R4. As illustrated in FIG. 7 for column 3, the contents of C3R1 are placed in C3R2, those of C3R2 in C3R3, those of C3R3 in C3R4, and the contents of C3R4 are deliberately destroyed by reverting to the normal A-C progression after the C3R4 data is placed in the D counter and clearing the D counter. The D counter is again inserted in the data path to place C4R1 to C4R4 data in the A-D-C path, which similarly results in C4R1—C4R3 data each being placed in the next succeeding compartment and C4R4 data being lost. This data handling sequence is continued until the C15 data has been so shifted. As can be seen from the data organization shown in FIG. 3, the effect of this handling sequence after one complete data pass is to shift the numeric data in register R1 to register R2, that in R2 up to R3, and that in R3 up to R4, while the numeric data in R4 is lost. It is notable that when shifting up, the data in columns C1 and C2 are also shifted along with the numeric data in columns C3 to C15 in order to preserve the correspondence between sign and decimal point information and the number associated thereto.

Another shifting operation which is used in handling the numeric data is SHIFT LEFT which consists of inserting the D counter into the normal progression of data for one compartment time every *n*th compartment time, where *n* equals the number of registers, so that the data progresses line-A, A-D, D-C, and C-line for each *n*th shift. Between each *n*th shift, the data is caused to follow the normal A-C progression while the data in D is preserved. Since the numeric data preserved in D is delayed by *n* compartment times, after one complete data pass the numeric data in the desired register will have been shifted one order of magnitude to the left.

For example, as discussed below in conjunction with the entry of a digit from the keyboard, it is desirable to shift the numeric data in the entry register R1 one column to the left since every digit enters the memory via numeric data entry compartment C3R1. This is accomplished by placing the contents of C3R1 in the A counter and inserting the D counter into the data path prior to the next shift. During this next shift, the contents of D are placed in C and the contents of A are placed in D. After this shift, the normal A-C progression is reverted to. During the next five shifts, the contents of D are preserved therein. Prior to the sixth shift ($n=6$), the D counter is again inserted into the data path. After this sixth shift, the contents of D are located in C, while D now contains the former contents of C4R1. Once again, the normal A-C progression is reverted to. This data handling sequence is continued until all the numeric data has been so shifted. As can be seen from FIG. 8 and the data organization shown in FIG. 3, the effect of this data handling sequence is to shift the numeric data in register R1 one column to the left. It is notable that, when shifting left, the data in columns CO to C2 are not disturbed in order to preserve the SYNC, SIGN, and DECIMAL information in CO, C1, and C2, respectively.

The basic data handling operation used to shift the instruction characters, which comprise the program stored in the memory, is termed SHIFT PROGRAM. This operation consists of inserting the D counter into the normal data progression so that all instruction characters progress line-A, A-D, D-C, and C-line, while the remaining data follows the normal line-A, A-C, C-line path. This results in each instruction character being placed in the next succeeding instruction character compartment. As noted in the discussion of FIG. 3, compartments C16 to C25 of RS, R3, and R4 are used exclusively for instruction characters. Thus, when shifting instruction characters, care must be taken to avoid disturbing numeric data which may be present in registers RO, R1, and R2 which are interspersed between RS and R3. This is accomplished as follows.

Figure 9:
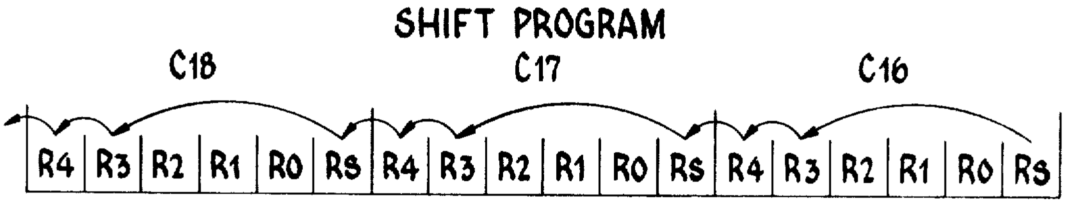

At the beginning of the data train, the normal A-C path is presented to the data. When the C16RS character is in A, the D counter is inserted into the data path and during the next shift its contents (which may comprise a new instruction character from the keyboard) are placed in the C counter, after which the contents of A are placed in D. The normal A-C data progression is then resumed until the C16R3 character is in A. At this time, the D counter is again inserted into the data path, its contents shifted to C, and the contents of A shifted to D. The D counter is now left in the data path and the data progresses A-D-C until the C17RS character is placed in D. The normal A-C progression is again resumed until the C17R3 character is in A. At this time, the A-D-C data progression is reinstituted until the C18RS character is in D. This data handling operation continues until the data pass is complete. At the end of SHIFT PROGRAM, the former contents of C25R4 are left in D, and may be preserved or destroyed as desired. The effect of SHIFT PROGRAM on a portion of the data train is shown in FIG. 9, with the arrows indicating the direction in which the characters are shifted.

A second data handling operation, termed ALIGN PROGRAM, is used to ring-shift the sequence of instruction characters when the calculator is placed in RECALL mode. This operation is performed in two passes of the serial data train. During the first pass, data in the instruction character compartments is passed both A-C and A-D, but no D-C shift is enabled. D is cleared before each A-D shift by the proper T2 signal 32 (see FIG. 5B). At the end of the first data pass, the C25R4 character is left in D by inhibiting the clear D signal. During the second data pass, the data is handled as in SHIFT PROGRAM. When the second pass is complete, each instruction character will have been shifted to the next succeeding instruction character compartment, except for the instruction character formerly in C25R4, the instruction character recall compartment. This character will now be located in the instruction character entry compartment C16RS. The ALIGN PROGRAM operation is schematically portrayed in FIG. 10, wherein the direction of movement of each character is depicted by arrowed line 50. Thus, the instruction character in C16RS is shifted to C16R3, that in C16R3 to C16R4, that in C16R4 to C17RS, etc. For simplicity, only that portion of the register organization which contains the instruction character compartments, namely C16—C25, is shown.

Figure 11:
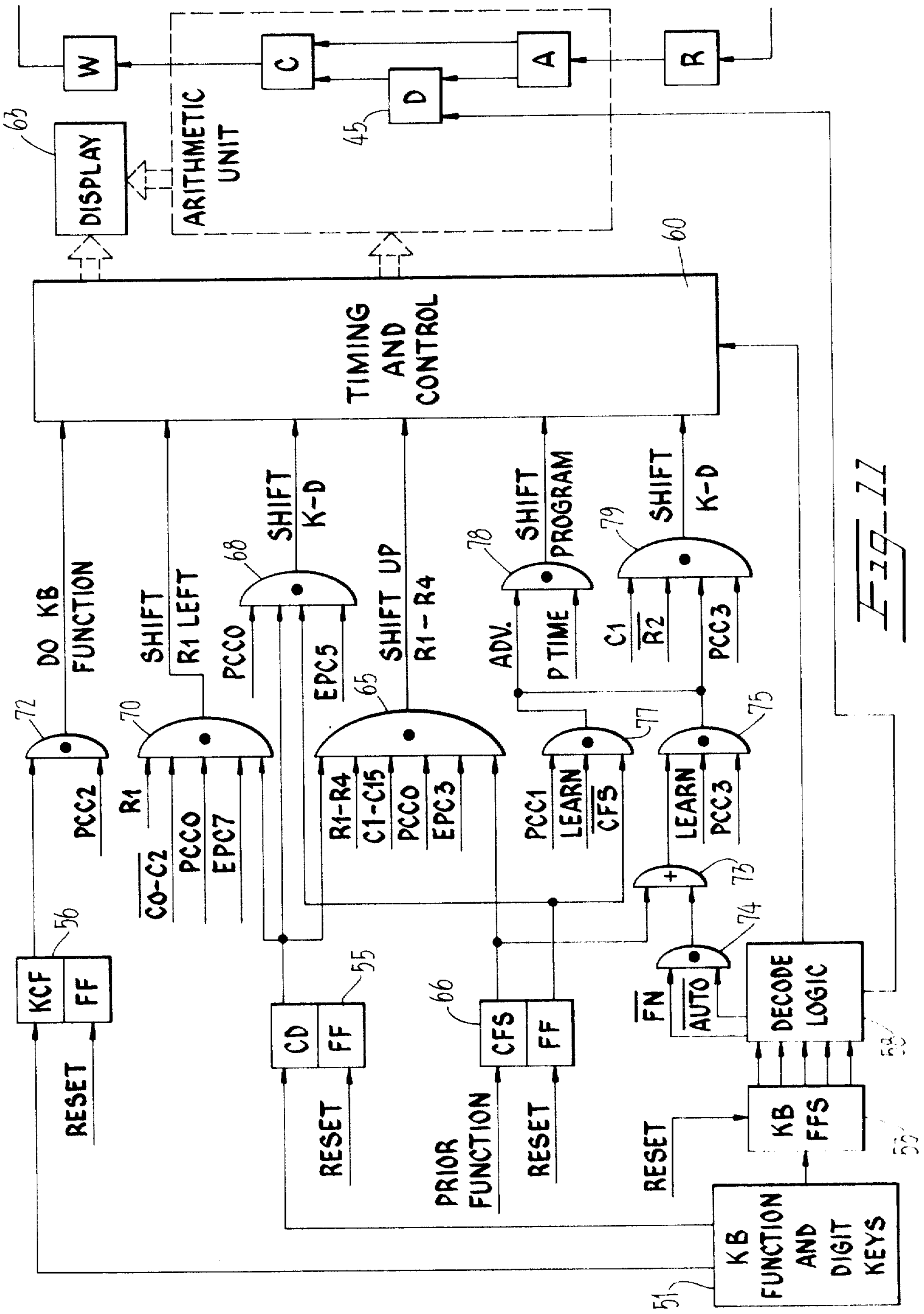
FIG. 11 is a block diagram of the calculator illustrating the entry of numeric data and instruction characters into the calculator memory.

FIG. 11 is a block diagram of the calculator illustrating the entry of numeric data and instruction characters into the memory. Function and digit keys 51 are coupled to switches, such as reed switches or the like (not shown), which are coupled in turn to keyboard flip-flops 53, common digit flip-flop 55, and keyboard common function flip-flop 56. For simplicity, the latter three elements will hereinafter be referred to as KBFFS, CDFF, and KCFFF. KBFFS are coupled through decode logic 58 to timing and control unit 60 and D counter 45. As is obvious to those skilled in the art, timing and control unit 60 may comprise various counters and logic gates required to control the above-described shifting operations and arithmetic functions to be performed on the data in the calculator memory. In the ensuing description, only those portions of timing and control unit 60 necessary to an understanding of the invention are set forth with particularity. Thus, the arithmetic unit and the display device 63, which may be a printer or a cathode-ray tube, are depicted in general form only. Control of these elements and interaction therebetween is schematically portrayed by means of phantom arrows.

The set output of CDFF 55, which indicates the actuation of a digit key, is coupled to AND-gate 65. The second input to AND-gate 65 is the set output of CFSFF 66, which denotes the fact that numeric data is already located in register R1. The remaining inputs to AND-gate 65 are timing signals PCCO, R1—R4, C1—C15, and EPC3. PCCO indicates that the program control counter 82, which is discussed below in conjunction with FIG. 12, holds a zero count, while EPC3 denotes that the entry phase counter, also discussed below, is set to a count of three. With the simultaneous occurrence of all of the above signals, AND-gate 65 produces an output signal which directs timing and control unit 60 to SHIFT UP the contents of registers R1—R4. The set output of CDFF 55 is also coupled to one input of AND-gate 68 along with the reset output of CFSFF 66 and timing signals PCCO and EPC5, the latter of which denotes a count of five in the entry phase counter. The output of AND-gate 68 directs timing and control unit 60 to shift the setting in the KBFFS 53 to the D counter 45. The set output of CDFF 55 is also coupled to the AND-gate 70 along with signals which indicate that neither COR1, CIR1, nor C2R1 is being accessed. The remaining inputs to AND-gate 70 are PCCO and EPC7, the latter specifying a count of seven in the entry phase counter. The output of AND-gate 70 directs timing and control unit to shift each digit in register R1 one column to the left. The set output of KCFFF 56, which indicates that a function key has been actuated, is coupled to AND-gate 72 along with the signal PCC2 indicating that the program control counter has been counted to two. The output of this AND-gate directs timing and control unit 60 to perform the function specified by the actuated key.

The entry phase counter may be any suitable counter capable of counting from zero to seven. In the preferred embodiment, it is coupled to CDFF 55, KCFFF 56, and program control counter 82 (see FIG. 12) in such a manner that it is clamped to zero (disabled) unless either CDFF 55 or KCFFF 56 is set concurrently with PCCO or PCC2 signal. The entry phase counter may be counted up by any suitable timing signal, such as the end of C25R4 or the beginning of the serial data train.

The set output of CFSFF 66 is further coupled to one input of OR-gate 73, the other input of which is the output of AND-gate 74. The inputs to AND-gate 74 are signals emanating from decode logic 58 which specify that neither the FIRST NUMBER, or FN, key nor the AUTO key has been actuated. Thus, OR-gate 73 will have an enabling signal at its output upon the occurrence of either of two conditions: either CFSFF is set, or neither FN nor AUTO has been actuated. The output of OR-gate 73 is coupled to the input of AND-gate 75 along with LEARN and PCC3 signals, the latter of which indicates that the program control counter holds a count of three.

The reset output of CFSFF 66 is also coupled to the input of AND-gate 77 along with PCC1 and LEARN signals: the former indicating that the program control counter has been counted to one, the latter that the LEARN key has been actuated. The common output of AND-gate 75 and AND-gate 77, termed ADVANCE, is coupled to AND-gate 78 along with P-TIME signal. P-TIME signal is produced during C16RS, C16R3, C16R4, C17RS, C17R3, C17R4, etc., and thus indicates that one of the instruction character compartments is being accessed. The output of AND-gate 78 directs timing and control unit 60 to SHIFT PROGRAM in the manner already discussed.

The output of AND-gate 75 is further coupled to AND-gate 79 along with C1 and $\overline{R2}$ signals. The concurrence of these three signals causes AND-gate 79 to produce an output signal directing timing and control unit 60 to shift the setting in the KBFFS 53 to D counter 45.

The entry of numeric data proceeds as follows. Regardless of whether the calculator is in NORMAL, LEARN, or RECALL mode, actuation of the first digit of a number sets the appropriate KBFFS 53 and CDFF 55. If a previous function has left numeric data in any of the compartments of register R1, a PRIOR FUNCTION signal from timing and control unit 60 will be present at the set input of CFSFF 66. The presence at the inputs of AND-gate 65 of both the PRIOR FUNCTION signal and a COMMON DIGIT signal concurrently with the above-noted proper timing signals produces an output signal which directs timing and control unit to SHIFT UP the contents of registers R1 to R4. Thus, the contents of register R1 are shifted up to register R2; those of R2 up to R3; those of R3 up to R4; and those of R4 are lost. The timing signals limit the output of AND-gate 65 so that the SHIFT UP operation does not disturb the contents of the instruction character compartments. After the SHIFT UP operation has been completed, CFSFF 66 is reset by a signal emanating from timing and control unit 60. The calculator is now ready for the entry of the digit indicated by the KBFFS 53 into the D counter 45.

When the EPC5 signal appears at the input of AND-gate 68, since CDFF 55 is now set and CFSFF 66 is reset, a SHIFT K-D signal appears at the output. This directs timing and control unit 60 to enable the setting of the KBFFS 53 to be placed in the D counter 45 via decode logic 58. With the digit now in D, the calculator is ready for the entry of the digit into the serial data train.

When AND-gate 70 is enabled by EPC7 and the remaining timing signals, a SHIFT R1 LEFT signal is produced which directs timing and control unit 60 to shift R1 left beginning with the data in C3R1. When this occurs, the digit in D counter 45 enters the calculator memory in the C3R1 compartment in the manner discussed above. After the digit has entered the memory, timing and control unit 60 produces a signal which resets CDFF 55 and KBFFS 53. The digit entry operation is now complete and may be repeated for as many digits as comprise the number desired to be entered to a maximum of 13 digits.

The entry of an instruction charaCTER begins with actuation of the LEARN key which produces a LEARN signal. When a function key is actuated thereafter, the appropriate KBFFS 53 and KCFFF 56 are set. Setting of KCFFF 56 enables program control counter 82 to step to one. If CFSFF 66 is set, indicating that the last operation performed was not entry of a digit from the keyboard, AND-gate 77 will not produce an ADVANCE signal, because $\overline{CFS}$ signal will be absent from the input thereof. The program control counter will then step to three and the concurrence of LEARN, PCC3 and CFS signals at the input of AND-gate 75 will produce an ADVANCE signal. The concurrence of the ADVANCE, C1, and $\overline{R2}$ signals at the input of AND-gate 79 results in an output signal directing timing and control unit 60 to shift the setting of KBFFS 53 into D counter 45.

With the instruction character now in the D counter 45, the concurrence of ADVANCE and P-TIME signals at the input of AND-gate 78 produces an output signal which directs timing and control unit 60 to perform a SHIFT PROGRAM operation. Since P-TIME first appears during C16RS time, the instruction character enters the calculator memory in the C16RS compartment. As discussed above, the contents of each instruction character compartment are then shifted to the next succeeding instruction character compartment.

After completion of the SHIFT PROGRAM operation, program control counter 82 is stepped to a count of two. The calculator is now enabled by the output of AND-gate 72 to perform the function specified by KBFFS 53. After the function has been completed, KCFFF 56 is reset by a signal emanating from timing and control unit 60.

If the last operation performed by the calculator was entry of numeric data from the keyboard, the entry operation for instruction characters is altered. As before, actuation of the function key will set the KBFFS 53 and KCFFF 56. Setting of KCFFF will again enable the program control counter to step to one. At this point, the logic diverges from that discussed above. Since CFSFF 66 is now reset (since a PRIOR FUNCTION signal has not previously occurred), $\overline{CFS}$ signal will be present at the input of AND-gate 77, along with PCC1 and LEARN. The resulting ADVANCE signal, when joined by a P-TIME signal at the input of AND-gate 78, will produce a SHIFT PROGRAM signal at the output thereof which directs the timing and control unit 60 to perform a SHIFT PROGRAM operation on the instruction characters. Since AND-gate 75 is disabled due to the absence of a PCC3 signal, AND-gate 79 is likewise disabled and no K-D shift can be performed. Since there is no setting in the D counter 45 (D counter zero), this SHIFT PROGRAM operation will place a zero in the instruction character access compartment C16RS. As seen from the code table of FIG. 16, zero is the stop code in the specific embodiment disclosed. Thus, when a function key is actuated after a digit has been entered, a stop code is entered into the calculator memory.

After SHIFT PROGRAM has been completed, the program control counter is stepped to a count of three. If neither FN nor AUTO is the function specified by the actuated key, the output of AND-gate 74 coupled through OR-gate 73, along with concurrent LEARN and PCC3 signals, will produce an ADVANCE signal at the output AND-gate 75, and the entry operation will proceed as described above. This results in the entry into the calculator memory of the code corresponding to the actuated function key.

If, however, either FN or AUTO is the function specified by the actuated key, after digit entry there will be no output signal from AND-gate 74 through OR-gate 73 to the input of AND-gate 75. Thus, no ADVANCE signal will result and, likewise, no SHIFT PROGRAM signal will appear at the output of AND-gate 78. Thus, when either FN or AUTO function have been specified by the operator after digit entry, only a stop code is entered into the memory.

As is evident from the above description, when the calculator is in LEARN mode of operation, actuation of one or more digit keys results in the entry of those digits into the calculator memory. Actuation of a function key likewise results in the entry into the calculator memory of a digit code representing that function, which is followed by performance of that function by the arithmetic and control units of the calculator. Thus, each function specified by the operator is stored in sequence in the memory.

Figures 12, 13:
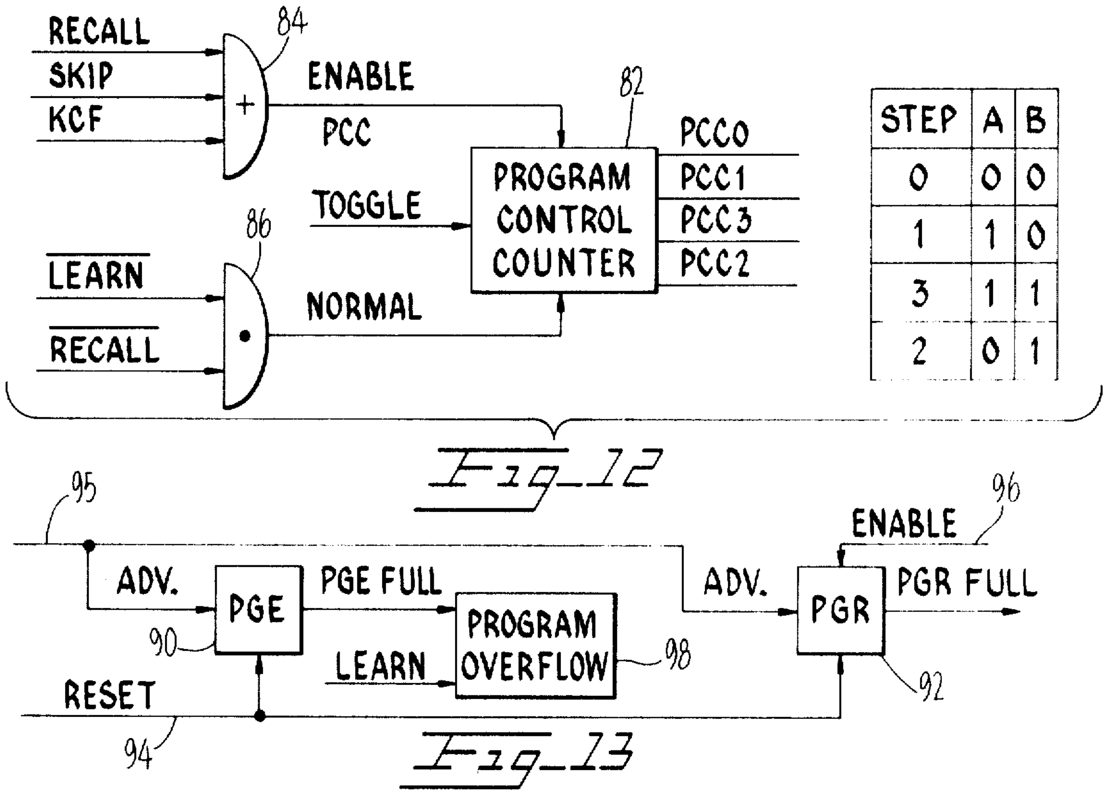
FIGS. 12, 13, 14A, and 14B illustrate portions of the timing and control unit utilized in the preferred embodiment and their operation.

FIG. 12 illustrates that portion of timing and control unit 60 which includes the program control counter and logic circuitry associated thereto. Program control counter 82 comprises any suitable four-state counter internally connected so as to count zero, one, three, two, and which is normally clamped to zero. For example, counter 82 may comprise two cross-coupled flip-flops having set outputs which attain the states shown in the truth table for each successive toggle input signal. Thus, starting with a count of zero (both flip-flops reset), the first toggle input will set the A flip-flop, the second will set the B flip-flop, the third will reset the A flip-flop, and the fourth will reset the B flip-flop. The counter may be toggled by any suitable timing signal, such as the end of C25R4 time of the SYNC signal at the beginning of the data train. Coupled to the ENABLE input of counter 82 is the output of OR-gate 84, the inputs to which are RECALL, SKIP, and KCFFF. RECALL signal is obtained from the set output of RECALL flip-flop 108 (see FIG. 15) and appears whenever the calculator is in RECALL mode. SKIP signal is obtained from the set output of SKIP flip-flop 102 (see FIG. 15) and will be present when the calculator is performing the ALIGN PROGRAM operation discussed below in conjunction with FIG. 15. KCF is present whenever KCFFF 56 is set (see FIG. 11). Connected to a second input of counter 82 is the output termed NORMAL of AND-gate 86. The inputs to this AND-gate are $\overline{LEARN}$ and $\overline{RECALL}$, which signify that neither the LEARN key nor the PROGRAM RESET key, respectively, has been actuated.

As has already been seen from the description of FIG. 11, the state of the program control counter 82 determines the permissible operations in the calculator. Digit entry, e.g., is only permitted during PCCO. Operations involving the instruction characters, such as SHIFT PROGRAM and RECALL PROGRAM, only occur during PCC1 and PCC3. Arithmetic and other data handling functions are only permitted during PCC2.

In operation, the program control counter 82 is normally clamped to zero. When any of the three signals appear at the input of OR-gate 84, program control counter 82 is enabled to step off zero. If the calculator is neither in LEARN nor RECALL mode, the NORMAL output of AND-gate 86 will cause the counter 82 to stop immediately to a count of two. In this condition, for each successive toggle input signal, the counter 82 will count zero, two, zero, two, etc. If either of the two input signals to AND-gate 86 is false, however—that is, if the calculator is in either LEARN or RECALL mode—concurrently with ENABLE signal from AND-gate 84, counter 82 will count zero, one, three, two, zero, one, etc., when toggled. When the ENABLE signal vanishes, the counter is clamped again to zero.

Figure 14A:
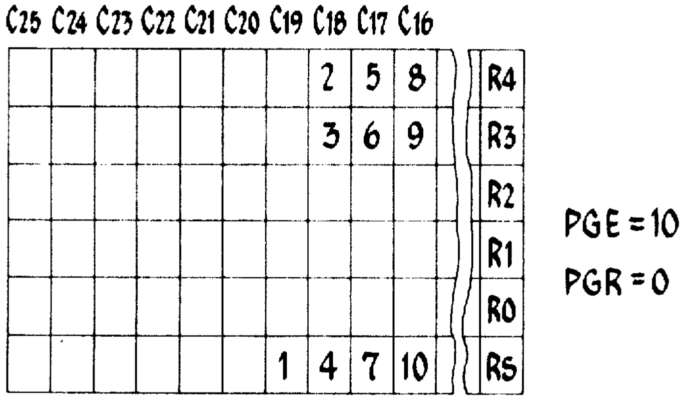
Figure 14B:
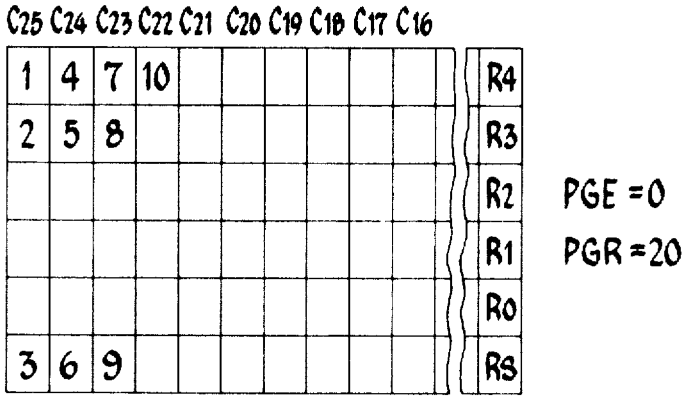

FIGS. 13, 14A, and 14B illustrate that portion of timing and control unit 60 which includes the program entry counter, or PGE, and the program recall counter, or PGR, and their operation. Both PGE counter 90 and PGR counter 92 may comprise any suitable counter capable of counting up to or down from a number equaling the number of instruction character compartments in the calculator register organization. In the preferred embodiment, the register organization is provided with 30 instruction character compartments and, thus, both PGE counter 90 and PGR counter 92 are scale-of-30 counters which are internally connected so as to reset to zero when a count of 30 is attained. Both counters have common reset input 94 on which there will be a RESET signal present whenever the LEARN key is first actuated to place the calculator in LEARN mode of operation. This RESET signal may be obtained in any suitable way, such as by sampling the output of a monostable multivibrator which is triggered by the actuation of the LEARN key. The toggle inputs of both counters are connected in parallel via line 95 to the ADVANCE signals obtained from AND-gates 75 and 77 of FIG. 11 and AND-gate 114 of FIG. 15. PGR counter 92 has an additional input labeled ENABLE which is obtained from the set output of RECALL flip-flop 108 (see !fig. 15) and which, when present, enables the counter to be counted up by an ADVANCE signal at its toggle input. In the absence of this ENABLE signal, PGR counter 92 is clamped to zero.

In operation, when the LEARN key is depressed, placing the calculator in LEARN mode of operation, a RESET signal is produced on line 94 which resets both counters to zero. Thereafter, PGE counter 90 is advanced one count whenever an ADVANCE signal is present at its toggle input, which will be true whenever an instruction character is entered into the calculator memory. Since there is no ENABLE signal on line 96, however, PGR counter 92 is clamped to zero. When all the instruction characters have been stored in the calculator memory, thus forming a complete program, the count in PGE counter 90 will total the number of instruction characters entered while the count in PGR counter 92 will be zero. For the 10-step program illustrated in FIGS. 14A and 14B, the PGE counter 90 will hold a count of 10 while the PGR counter 92 will hold a count of zero. When the calculator is placed in RECALL mode, recall flip-flop 108 (see FIG. 15) sets and enables PGR counter 92 to count.

As discussed more fully below, the first data handling operation performed by the calculator when in RECALL mode is ALIGN PROGRAM in which the entire set of instruction characters is shifted in the memory portion by several successive data passes, one instruction compartment at a time, until the first entered instruction character is located in the instruction character recall compartment C25R4. Since each shift is accompanied by an ADVANCE signal from AND-gate 114 of FIG. 15, both counters are stepped each time a shift occurs. When ALIGN PROGRAM is completed, the count in PGR counter 92 will total the number of shifts required to place the first instruction character in the recall position. The PGE counter will have been stepped from its initial value (equal to the number of instruction characters in the program) to its maximum value since the PGR counter was stepped a numbers of counts equal to the maximum count minus the initial value of the PGE counter. Having attained this maximum count, the PGE counter will have internally reset to zero as discussed above. This transition of the PGE counter to zero produces a signal termed PGE FULL which is used to indicate the end of ALIGN PROGRAM and to condition certain logic circuits for RECALL PROGRAM operation discussed below. For the 10-step program illustrated in FIG. 14B, when instruction Character 01 has been placed in instruction character recall compartment C25R4, PGR counter 92 will hold a count of 20, while PGE counter 90 will have transitioned from a maximum of 30 to zero.

As discussed more fully below, the second data handling operation when the calculator is in RECALL mode is termed RECALL PROGRAM during which the instruction character in instruction character recall compartment C25R4 is removed, used to control the functional operation of the calculator and placed back in the memory in the instruction character entry compartment. At the same time, the contents of each instruction character compartment are shifted toward the recall compartment by one instruction character compartment. As before, each shift is accompanied by an ADVANCE signal from the above-mentioned gates and, thus, both PGE counter 90 and PGR counter 92 are advanced one count for each shift performed. When all instructions have been performed, the count in PGE counter 90 will total the number of instructions performed which is equal to the number of instructions originally entered. The PGR counter will have been stepped from its initial value (equal to the maximum count minus the number of instruction characters in the program) to its maximum value. Having attained this maximum count, the PGR counter will have internally reset to zero as discussed above. This transition of the PGR counter to zero is used to signify the end of RECALL operation and is termed PGR FULL. In the 10-step program illustrated in FIG. 14A, when RECALL operation is completed, PGE counter 90 will be set to a count of 10 while PGR counter will hold a zero count.

The PGE FULL signal is also utilized to indicate that the number of instruction characters entered into the memory exceeds the number of instruction character compartments, i.e., PROGRAM OVERFLOW. As shown in FIG. 13, the concurrence of PGE FULL and LEARN signals activates program overflow unit 98. Program overflow unit 98 may comprise any suitable means for providing an indication to the operator that the PROGRAM OVERFLOW condition exists. For example, this unit may be a panel lamp mounted on the calculator keyboard, or a mechanical interlock which prevents operation of any key whenever unit 98 is activated.

Figure 15:
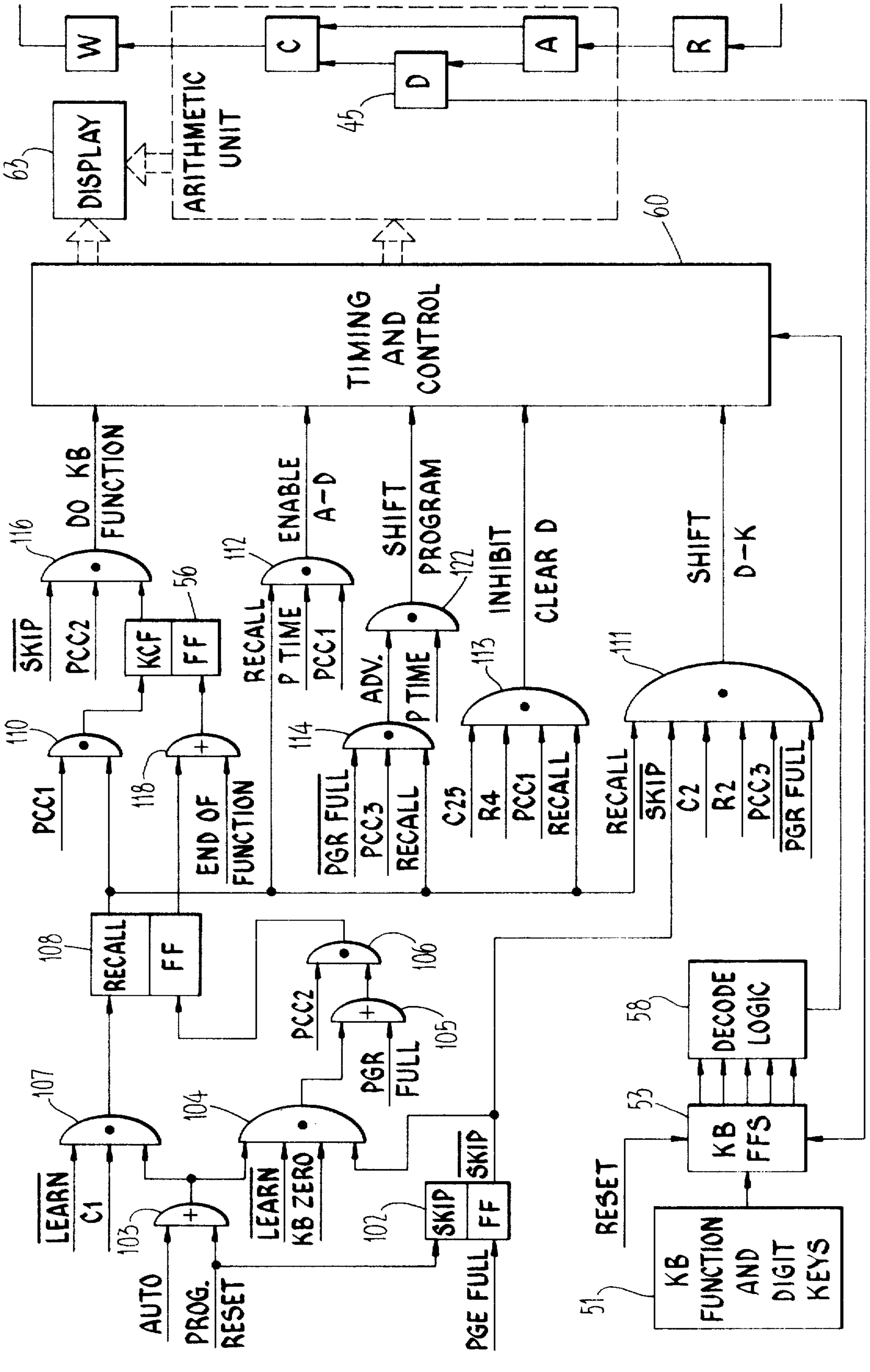
FIG. 15 is a block diagram of the calculator illustrating the RECALL mode of operation.

FIG. 15 is a block diagram of the calculator illustrating the RECALL mode of operation. To avoid unnecessary complexity, those portions of the calculator circuitry which are active during digit entry have been omitted, it being understood that digit entry in RECALL proceeds in the manner already described in conjunction with FIG. 11. It is desirable that the calculator only be removed from LEARN mode by actuation of the PROGRAM RESET key. This is accomplished by making LEARN and PROGRAM RESET signals mutually exclusive in any suitable way. In the preferred embodiment, this is achieved by a mechanical interlock between the two keys arranged so that actuation of the LEARN key releases the PROGRAM RESET key and vice versa.

PROGRAM RESET signal, which is produced whenever PROGRAM RESET key is actuated, is coupled to the set input of SKIP flip-flop 102 and to the input of OR-gate 103. PGE FULL signal, obtained from PGE counter 90 (see FIG. 13) is coupled to the reset input of SKIP FF 102. AUTO signal, which is produced whenever AUTO key is actuated, is also coupled to the input of OR-gate 103, whose output is coupled to the input of AND-gate 104, along with the reset output of SKIP FF 102 and $\overline{\text{LEARN}}$ and KB zero signals. When all these signals are concurrently present at the input of AND-gate 104, an output signal is produced which is coupled through OR-gate 105 to AND-gate 106. The second input to OR-gate 105 is PGR FULL signal (see FIG. 13). When the output of OR-gate 105 and PCC2 are both present at the input of AND-gate 106, an output signal is produced which resets RECALL flip-flop 108. The output of OR-gate 103 is also coupled to the input of AND-gate 107, along with $\overline{\text{LEARN}}$ and C1 signals. When all these signals are concurrently present at the input of AND-gate 107, an output signal is produced which is coupled to the set input of RECALL FF 108.

The set output of RECALL FF 108, which indicates that the calculator is in RECALL mode, is coupled to the inputs of AND-gates 110—114. With the concurrence of RECALL and PCC1 signals at the input of AND-gate 110, an output signal is produced which is coupled to the set input of KCFFF 56. The set output from KCFFF 56 is coupled to the input of AND-gate 116 along with SKIP signal obtained from the reset output of SKIP FF 102 and PCC2 signal. With the concurrence of these three signals, the output of AND-gate 116 produces a signal which directs timing and control unit 60 to perform the function specified by the KBFFS 53. The reset output of RECALL FF F108 is coupled to one input of OR-gate 118, the other input to which is an END OF FUNCTION signal obtained from timing and control unit 60 whenever the calculator has completed a function when in RECALL mode. The output of OR-gate 118 is coupled to the reset input of KCFFF 56.

The reset output of SKIP FF 102 is also coupled to the input of AND-gate 111 along with timing signals C2, R2, and PCC3, and $\overline{\text{PGR FULL}}$ signal which is obtained from PGR counter 92 (see FIG. 13). The output signal of AND-gate 111 directs timing and control unit 60 to shift the count in D counter 45 to KBFFS 53. The output signal of AND-gate 112, which is produced whenever RECALL, P-TIME, and PCC1 signals appear concurrently at its input, directs timing and control unit 60 to enable an A-D shift. When PCC1 signal is applied to the input of AND-gate 113, along with timing signals C25 and R4 and RECALL signal, the output of AND-gate 113 directs timing and control unit 60 to inhibit clearing of D counter 45. The output of AND-gate 114 which is labeled ADVANCE and which is produced when $\overline{\text{PGR FULL}}$, RECALL, and PCC3 signals are present at the input thereof, is coupled to the input of AND-gate 122, the output of which directs timing and control unit 60 to perform a SHIFT PROGRAM operation in the manner discussed above whenever P-TIME signal occurs concurrently.

To bring the calculator out of LEARN mode into RECALL mode, PROGRAM RESET key must be actuated, thereby producing PROGRAM RESET signal which sets SKIP FF 102. Setting of SKIP FF 102 enables program control counter 82 via AND-gate 84 (FIG. 12). Since actuation of the PROGRAM RESET key results in $\overline{\text{LEARN}}$ signal, while RECALL FF 108 is initially reset which results in $\overline{\text{RECALL}}$, the normal output of AND-gate 86 requires program control counter 82 to immediately stop to a count of two. The concurrence of PROGRAM RESET, C1 and $\overline{\text{LEARN}}$ signals at the input of AND-gate 107 produces an output signal which sets RECALL FF 108. Setting of RECALL FF 108 causes $\overline{\text{RECALL}}$ signal to vanish from the input of AND-gate 86, thereby removing NORMAL signal and allowing program control counter 82 to count fully. The calculator is now ready for ALIGN PROGRAM operation.

The next toggle of program control counter 82 sets this counter to zero, during which state no RECALL logic action occurs. When this counter is toggled again, it steps to one (as described above in conjunction with FIG. 12). At this time, the concurrence of PCC1 and RECALL signals at the input of AND-gate 110 causes KCFFF 56 to set, while RECALL, PCC1, and P-TIME signals at the input to AND-gate 112 produce an output directing timing and control unit 60 to enable an A-D shift. As described above in conjunction with the ALIGN PROGRAM data handling operation, the end of the data pass finds the former C25R4 character now located in D counter 45. At this time, the concurrence of PCC1, RECALL, C25, and R4 signals at the input of AND-gate 113 produces an output signal which directs timing and control unit 60 to inhibit the clearing of D counter 45.

When program control counter 82 is stepped to a count of three, the $\overline{\text{PGR FULL}}$, RECALL, and PCC3 signals at AND-gate signals at AND-gate 114 produce an ADVANCE signal which is presented to the input of AND-gate 122 along with P-TIME signal. The output of AND-gate 122 directs timing and control unit 60 to perform a SHIFT PROGRAM operation as described above. ADVANCE signal counts up PGE counter 90 and PGR counter 92 by one count (FIG. 13). At the end of SHIFT PROGRAM, program control counter 82 is stepped to a count of two. As is evident from the discussion below, since neither $\overline{\text{SKIP}}$ nor PGE FULL signals are present, no RECALL logic occurs during PCC2 and program control counter 82 is stepped to zero.

The above-described ALIGN PROGRAM operation continues until the first entered instruction character is placed in the instruction character recall compartment C25R4 and PGE counter 90 resets to zero (as described above in conjunction with FIG. 13), thereby producing PGE FULL signal. ALIGN PROGRAM is now complete. At this time, numeric data is normally entered from the keyboard.

The appearance of PGE FULL signal resets SKIP FF 102, thereby producing $\overline{\text{SKIP}}$ signal. This conditions the calculator to perform RECALL PROGRAM operation, during which each successive instruction character is used to control the functional operation of the calculator on numeric data. The RECALL logic operation in RECALL PROGRAM during PCC1 is identical to that encountered in ALIGN PROGRAM discussed immediately above. When program control counter 82 steps to a count of three, however, the SHIFT D-K operation is performed due to the additional presence at the input of AND-gate 111 of $\overline{\text{SKIP}}$ signal. This sets KBFFS 53 to the count in D counter 45, which is the first instruction character in the program. When program control counter 82 steps to a count of two, $\overline{\text{SKIP}}$, PCC2, and KCFFF set signals are all present at AND-gate 116. Thus, the output of AND-gate 116 directs timing and control unit 60 to perform the function now specified by KBFFS 53.

After the function has been performed, timing and control unit 60 produces an end of function signal which resets KCFFF 56 through OR-gate 118, program control counter 82 steps to zero, and the RECALL PROGRAM operation continues until either a stop code (KB zero) is placed in KBFFS 53 or each instruction character in the program has been utilized once to control the operation of the calculator.

If the D-K shift has resulted in KBFFS 53 being set to zero, when program control counter 82 steps to a count of two the output of AND-gate 104 coupled through OR-gate 105 to AND-gate 106 concurrently with PCC2 signal will cause RECALL FF 108 to be reset. The reset output of RECALL FF 108 coupled through OR-gate 118 will reset KCFFF 56. Since SKIP FF 102 was previously reset by PGE FULL signal, no signal is present at the input of OR-gate 84 (FIG. 12), and program control counter 82 is clamped to zero. This places the calculator in IDLE mode.

RECALL PROGRAM may be resumed at this point by actuation of the AUTO key, thereby producing an AUTO signal which is coupled through OR-gate 103 to the input of AND-gate 107. The concurrence of AUTO, $\overline{\text{LEARN}}$, and C1 signals will cause RECALL FF 108 to be set by the output of AND-gate 107. With RECALL A FF 108 set, program control counter 82 will again be enabled by the output of OR-gate 84 to count fully (since $\overline{\text{RECALL}}$ is absent from AND-gate 86), and RECALL PROGRAM will ensue in the manner described above.

Optionally, if desired, the RECALL operation may be restarted from the beginning of the program after the RECALL PROGRAM operation has been halted by KB zero. This is accomplished by actuating the PROGRAM RESET key, rather than the AUTO key, which actuation will cause SKIP FF 102 to set, thereby enabling ALIGN PROGRAM already fully discussed above.

After the last instruction character in the program has been used, the ADVANCE signal from the output of AND-gate 114 during the next RECALL PROGRAM cycle will count PGR counter 92 full. PGR FULL signal, coupled through OR-gate 105 to the input of AND-gate 106, when concurrent with PCC2, will cause the output of AND-gate 106 to reset RECALL FF 108. The reset output of RECALL FF 108 causes KCFFF 56 to reset. Since SKIP FF 102 is still reset, no enabling signal is present at OR-gate 84, program control counter 82 is clamped to zero, and RECALL PROGRAM ends.

Thus, after the entire program has been learned, the operation of PROGRAM RESET key causes the calculator to repeatedly shift the set of instruction characters comprising the program according to the ALIGN PROGRAM operation until the first-entered instruction character is located in the instruction character recall compartment. At this point, numeric data is normally entered via the keyboard, the AUTO key is actuated, and the RECALL PROGRAM operation begins during which time each instruction character is used in succession to control the performance of the function which is represented on the newly entered data. RECALL PROGRAM continues until either (1) a stop code is sensed or (2) the end of the program has been reached. If the former condition obtains, then the stop code places the calculator in IDLE mode. At this time, the next relevant numeric data is normally entered via the keyboard, the AUTO key is again actuated, and the RECALL PROGRAM operation continues until either of the two conditions obtains. If another stop code is sensed, the calculator is again placed in IDLE mode, more numeric data is entered, etc. until the end of the program is reached. If, for any reason, it is desired to restart the program before it has been completed, the PROGRAM RESET key is actuated which results in ALIGN PROGRAM operation until the first-entered instruction character is located in the instruction character compartment.

Figure 1:
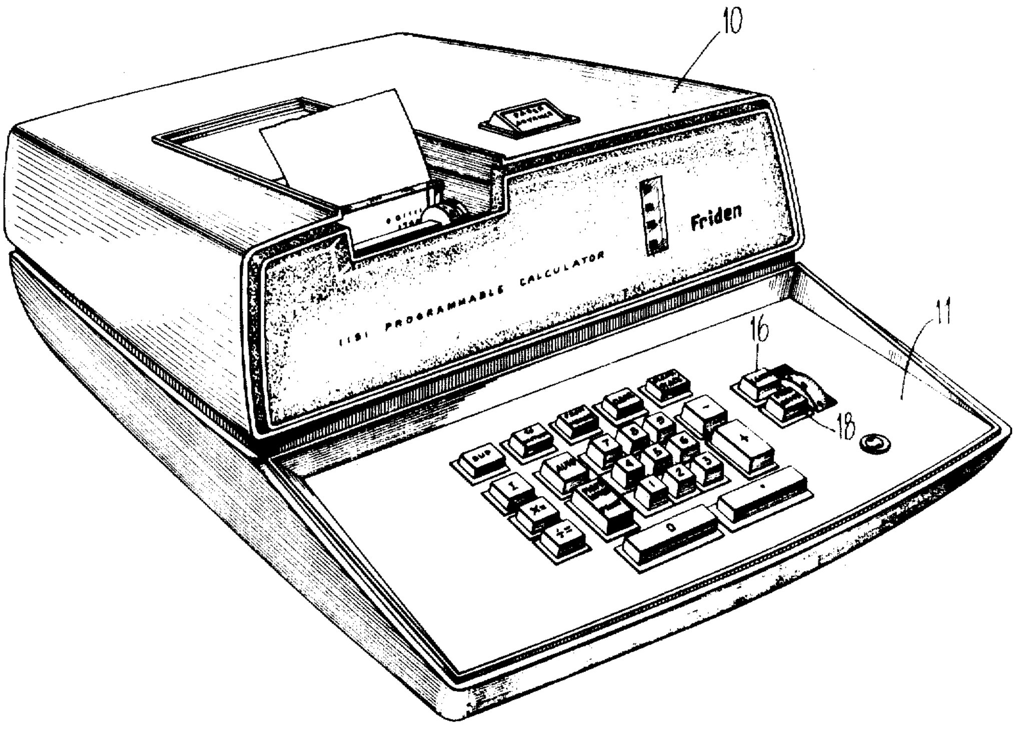
FIG. 1 is a perspective view of an electronic desk top calculator embodying the invention.
Figure 2:
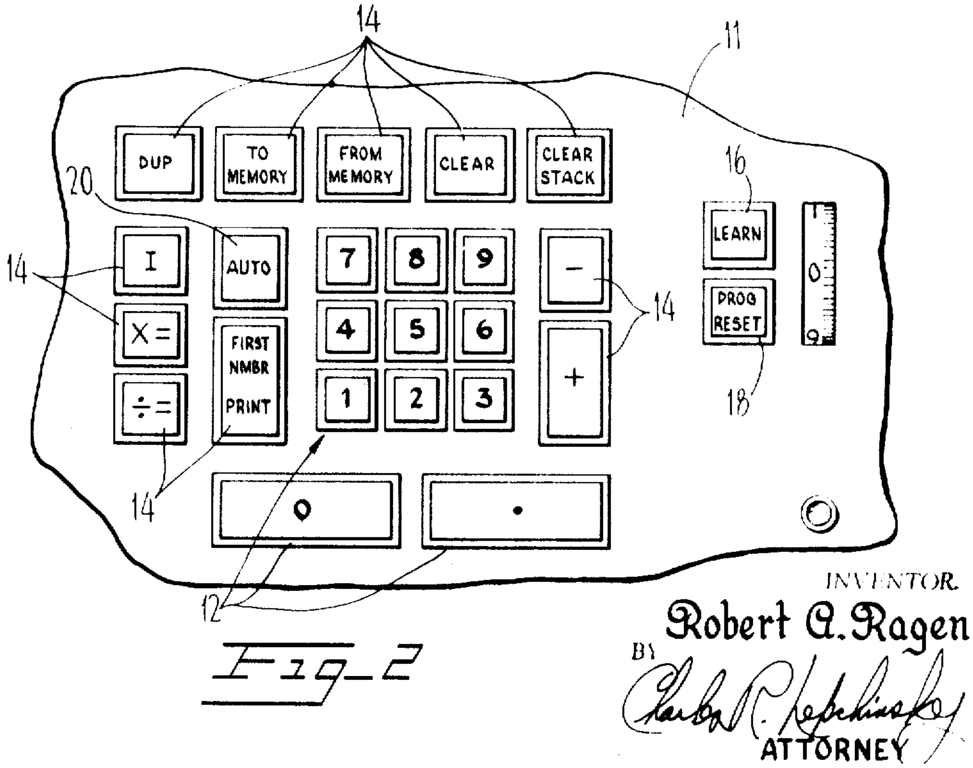
FIG. 2 illustrates the keyboard of a preferred embodiment of the invention.

FIG. 16 is a code table illustrating the instruction characters used to specify the programmable function in the preferred embodiment. Where appropriate, the identifying symbol used on a given function key as illustrated in the keyboard of FIG. 2 is included in parentheses after the function. The instruction character which designates MULTIPLY function, for example, the identifying symbol for which is X, is the digit one, while the instruction character for ADD (+) function is eight. As is evident from FIGS. 2 and 16, not all keyboard functions need be programmable. Thus, for example, in the preferred embodiment, the functions CLEAR and CLEAR STACK do not have a corresponding instruction character and are, therefore, not programmable. It is understood that the invention is not limited to the particular functions utilized in the preferred embodiment, but may include other functions such as SQUARE ROOT, etc.

The following is an illustration of the actual operation of the calculator by an operator for a typical problem. The problem is:

$$\frac{(10+20)-(3\times 2)}{4}=6$$

The operator would solve the problem by actuating the keys in the following sequence:

1
0
FN
2
0
+
3
FN
2
X
–
4

FN

If it were desired to solve this same general problem for several sets of numeric data, the operator would begin by actuating the LEARN key and then proceed in the manner outlined above. Thus, the keys would be actuated in the following sequence:

LEARN
1
0
FN
2
0
+
3
FN
2
X
–
4

FN

After the last actuation of the FN key, the correct solution six would be indicated by the display device. The sequence of instruction characters stored in the calculator memory would be:

0, 0, 8, 0, 0, 1, 9, 0, 3, 6 with the first character, zero, located in C19RS compartment and the last character, six, stored in C16RS compartment. When it is desired to solve the same general problem using a different set of numeric data, for example:

$$\frac{(12+13)-(3\times 4)}{13}=1$$

the operator will proceed by actuating the following keys in the sequence noted:

PROG. RESET
1
2
AUTO
1
3
AUTO
3
AUTO
4
AUTO
1
3
AUTO

After each actuation of the AUTO key, the calculator will automatically perform those functions specified by the instruction codes in sequence until a stop code is sensed. After the last actuation of the AUTO key, the calculator will complete the problem and display the answer. To solve the same general problem with additional sets of numeric data, the operator need only repeat the sequence noted immediately above. When it is desired to solve a different general problem using one or more sets of numeric data, the operator can proceed as above by actuating the LEARN key and the various digit and function keys in their proper sequence.

The programmable calculator disclosed above thus provides a highly flexible tool for use in the solution of problems involving one or more sets of numeric data. One highly desirable feature of the invention is the simplicity of its operation. As shown in the above example, to solve a problem in LEARN mode the operator merely actuates the LEARN key and then proceeds in the same manner as in NORMAL mode. To solve a learned problem the operator merely actuates the PROGRAM RESET key, and then enters the numeric data, actuating the AUTO key after each entry. The result is automatically calculated and displayed.

Another highly desirable feature of the calculator is that intermediate calculations not included in a given program may be performed when the calculator is in RECALL mode whenever a stop code has been sensed. Every program will normally include at least one stop code. As seen in the discussion of the operation of the calculator in RECALL mode, when a stop code has been sensed, the calculator is placed in IDLE mode, thereby ceasing the RECALL program operation. Numeric data may then be entered into the calculator via the keyboard, and functions performed thereon by actuation of one or more function keys, without disturbing the sequence of instruction characters which constitute the program. When these calculations have been completed, the RECALL program operation may be resumed by actuating the AUTO key. Since entry of numeric data from the keyboard is always accompanied by SHIFT UP of the contents of registers R1—R4, care must be taken to ensure that any intermediate results of the partially performed program are not lost during SHIFT UP operation as a result of being located in register R4. This problem may be alleviated by providing a data organization with additional registers R5, etc.

It is understood that this invention is not limited to specific details of construction and arrangement thereof herein illustrated, and that changes and modifications may occur to one skilled in the art without departing from the spirit of the invention. For example, the entry circuitry may be designed so that the RECALL mode of operation of the calculator may be reinstituted after the end of PROGRAM RECALL by the AUTO key rather than the PROGRAM RESET key.

I claim:

1. A programmable electronic calculator for performing operations on numeric data in accordance with instruction characters and having a NORMAL mode, a LEARN mode, and a RECALL mode comprising:

keyboard means for generating numeric data and instruction characters denoting operations to be performed on said numeric data;

a memory comprising a plurality of interlaced registers, said registers having an ordered plurality of compartments for storing said data and said characters, like order compartments of said plurality of registers being juxtapositioned in said memory, said compartments including a preselected numeric data entry compartment, a preselected instruction character entry compartment, and a preselected instruction character recall compartment; and processing means coupled to said keyboard means and said memory for performing data handling operations on said data and said characters, said processing means including;

entry means coupled to said keyboard means for serially placing keyboard-generated numeric data into said preselected numeric data entry compartment and keyboard-generated instruction characters into said preselected instruction character entry compartment, and arithmetic and control means coupled to said memory for performing operations on said numeric data in accordance with said instruction characters.

2. The calculator of claim 1 wherein said memory includes an acoustic delay line.

3. The calculator of claim 1 wherein said processing means includes means for preventing entry of said instruction characters into a predetermined register of said memory.

4. The calculator of claim 1 wherein said processing means includes means for preventing said arithmetic and control means from performing arithmetic operations on said instruction characters.

5. The calculator of claim 1 wherein said entry means includes means for shifting each instruction character one instruction compartment away from said instruction character entry compartment during the entry of an instruction character from said keyboard means when said calculator is in LEARN mode.

6. The calculator of claim 1 wherein said arithmetic and control means includes means for indicating the entry of a number of instruction characters exceeding the number of instruction character compartments.

7. The calculator of claim 1 wherein said processing means includes means for generating a stop code instruction character for entry into said instruction character entry compartment after numeric data has been entered into said numeric data entry compartment and said keyboard means has generated an instruction character when said calculator is in LEARN mode.

8. The calculator of claim 1 wherein said processing means includes means for enabling said arithmetic and control means to perform the operation denoted by the instruction character generated by said keyboard means after said instruction character has been placed into said instruction character entry compartment when said calculator is in LEARN mode.

9. The calculator of claim 1 wherein said preselected numeric data entry compartment, said preselected instruction character entry compartment, and said preselected instruction character recall compartment are each located in a different one of said plurality of registers.

10. The calculator of claim 1 wherein said entry means includes means for shifting all numeric data one data register away from the register containing said preselected numeric data entry compartment prior to the entry of a first digit of numeric data from said keyboard means into said preselected numeric data entry compartment.

11. The calculator of claim 10 wherein said entry means includes means for shifting each digit of the numeric data located in the register containing said preselected numeric data entry compartment to the compartment of next highest order in said register during the entry of a digit from said keyboard means into said numeric data entry compartment.

12. The calculator of claim 1 wherein said processing means includes means for aligning the complete set of entered instruction characters to place the first-entered instruction character in said instruction character recall compartment while preserving the sequential order of said set when said calculator is in RECALL mode.

13. The calculator of claim 12 further including a manually actuatable program reset means coupled to said processing means for enabling said instruction character aligning means whenever said reset means is actuated.

14. The calculator of claim 12 wherein said processing means includes means for ring-shifting said set of instruction characters, said ring-shifting means including means for removing an instruction character from said instruction character recall compartment, means for enabling said entry means to place said instruction character into said instruction character entry compartment, and means for shifting each of the remaining instruction characters one instruction character compartment toward said instruction character recall compartment so that said set of instruction characters is ring shifted in said memory.

15. The calculator of claim 14 wherein said processing means includes means for placing said removed instruction character into said keyboard means to enable said arithmetic and control means to perform the function denoted by said removed instruction character.

16. The calculator of claim 14 wherein said processing means includes means for halting the ring-shifting of said set of instruction characters after the last-entered instruction character has been placed into said instruction character entry compartment.

17. The calculator of claim 14 wherein said processing means includes means responsive to a stop code instruction character for halting the ring-shifting of said set of entered instruction characters.

18. The calculator of claim 17 further including manually actuatable resume means coupled to said processing means for enabling said ring-shifting means to resume ring-shifting said set of instruction characters upon actuation of said resume means.